United States Patent
Qiu et al.

(10) Patent No.: US 11,506,753 B2
(45) Date of Patent: Nov. 22, 2022

(54) SYSTEMS AND METHODS FOR RADAR BASED FACE AUTHENTICATION ANTI-SPOOFING

(71) Applicant: Samsung Electronics Co., Ltd., Suwon-si (KR)

(72) Inventors: Wenxun Qiu, Allen, TX (US); Abhishek Sehgal, Richardson, TX (US); Kuldeep Gill, Richardson, TX (US); Vutha Va, Plano, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 480 days.

(21) Appl. No.: 16/595,316

(22) Filed: Oct. 7, 2019

(65) Prior Publication Data
US 2020/0319301 A1 Oct. 8, 2020

Related U.S. Application Data

(60) Provisional application No. 62/830,625, filed on Apr. 8, 2019.

(51) Int. Cl.
  *G01S 7/41* (2006.01)
  *G01S 7/295* (2006.01)
  (Continued)

(52) U.S. Cl.
  CPC ............ *G01S 7/412* (2013.01); *G01S 7/295* (2013.01); *G01S 7/417* (2013.01); *G06V 40/166* (2022.01); *G06V 40/172* (2022.01); *G06V 40/40* (2022.01)

(58) Field of Classification Search
  CPC ..... H04W 12/06; H04W 84/12; H04W 12/79; G01S 7/006; G01S 7/415; G01S 13/003;
  (Continued)

(56) References Cited

U.S. PATENT DOCUMENTS 8,280,046 B2 * 10/2012 Rudolf ................. H04L 9/0875
                                                      713/168
8,468,363 B2    6/2013 Posamentier
(Continued)

FOREIGN PATENT DOCUMENTS

KR    10-2014-0001163 A    1/2014

OTHER PUBLICATIONS

International Search Report dated Jun. 19, 2020 in connection with International Patent Application No. PCT/KR2020/003421, 4 pages.
(Continued)

*Primary Examiner* — Olumide Ajibade Akonai

(57) ABSTRACT

A method and electronic device for radar-based face authentication anti-spoofing for determining access to the electronic device. The electronic device includes a radar transceiver and at least one processor. The at least one processor is configured to transmit, via the transceiver, a first set of signals, generate a channel impulse response (CIR) based on receipt of reflections of the first set of signals, detect a first CIR tap in the CIR, determine a selection of CIR data based on the detected first CIR tap, determine a profile matching metric based on comparison of the selection of CIR data to a set of predetermined reference signals, and determine
(Continued)

whether to allow access to the electronic device based on comparison of the profile matching metric to a profile matching threshold.

20 Claims, 8 Drawing Sheets

(51) Int. Cl.
 *G06V 40/40* (2022.01)
 *G06V 40/16* (2022.01)
(58) Field of Classification Search
 CPC .......... G01S 13/88; G01S 7/417; G01S 13/56; G01S 7/412; G01S 7/41; G01S 7/411; G01S 13/867; G01S 7/292; G06V 40/172; G06V 40/166; G06V 10/143; G06V 10/82; G06V 40/168; G06V 40/40; G06V 40/174; G06V 40/20; G06F 3/017; G06F 21/32; G06F 21/31; G06N 3/0454; G06T 2207/30201
 See application file for complete search history.

(56) References Cited

U.S. PATENT DOCUMENTS

| | | | |
|---|---|---|---|
| 8,542,879 | B1 | 9/2013 | Nechyba et al. |
| 10,591,586 | B2 | 3/2020 | Trotta et al. |
| 2013/0336144 | A1 | 12/2013 | Azadet et al. |
| 2017/0124384 | A1 | 5/2017 | Allyn |
| 2017/0212210 | A1* | 7/2017 | Chen ..................... G01S 5/0226 |
| 2017/0212234 | A1 | 7/2017 | Heath et al. |
| 2018/0365975 | A1 | 12/2018 | Xu et al. |
| 2019/0219687 | A1* | 7/2019 | Baheti ................ A61B 5/02438 |
| 2019/0349365 | A1* | 11/2019 | Sambhwani .......... G06N 3/0454 |
| 2020/0073480 | A1* | 3/2020 | Hof ..................... G06F 3/04847 |
| 2020/0191943 | A1* | 6/2020 | Wu ....................... G01S 13/726 |

OTHER PUBLICATIONS

Written Opinion of the International Searching Authority dated Jun. 19, 2020 in connection with International Patent Application No. PCT/KR2020/003421, 3 pages.

* cited by examiner

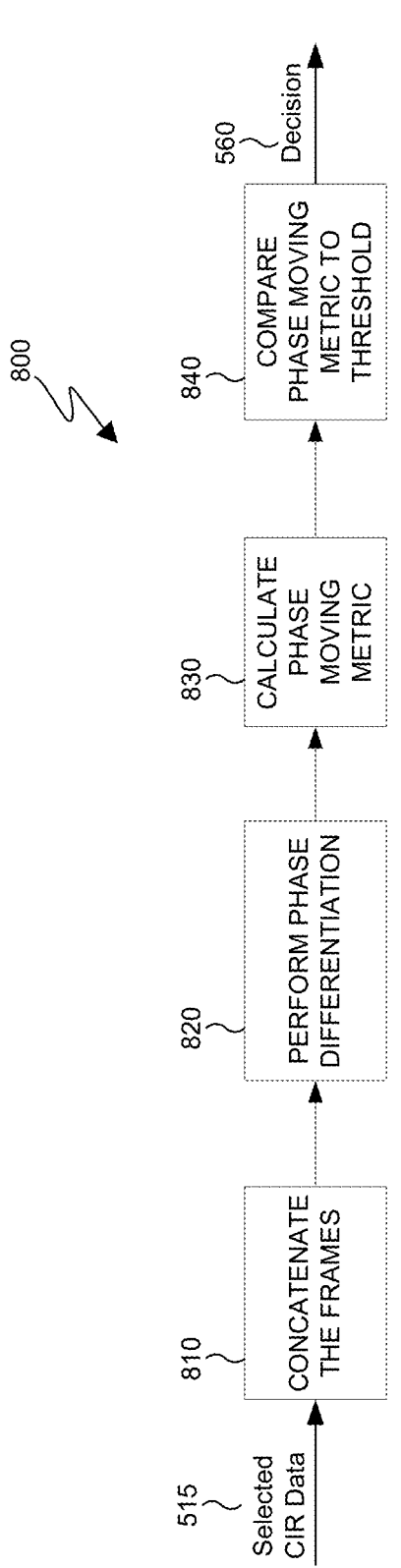
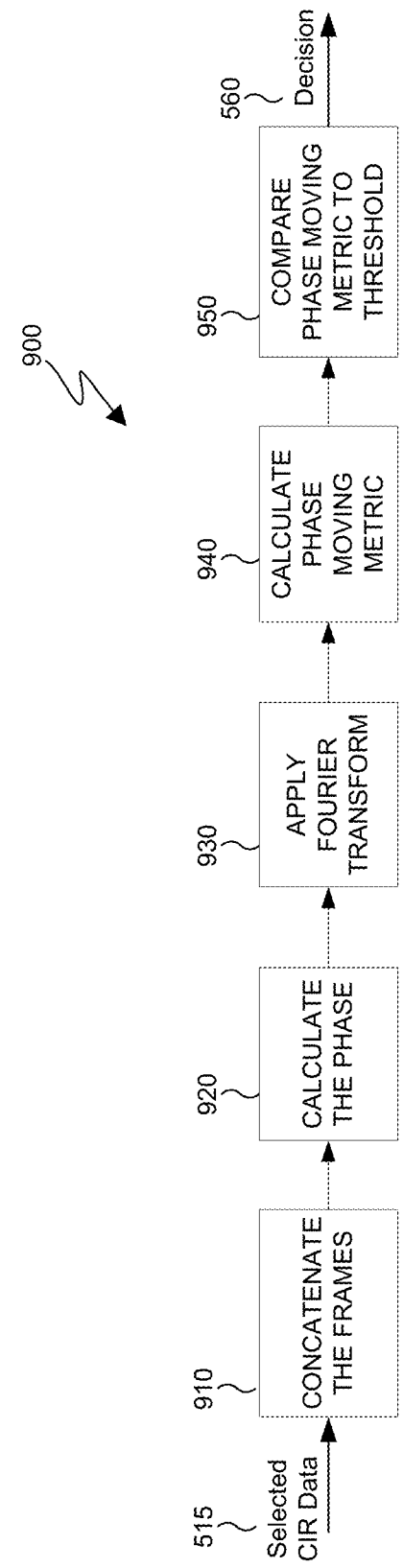
FIG. 8
FIG. 9

US 11,506,753 B2

SYSTEMS AND METHODS FOR RADAR BASED FACE AUTHENTICATION ANTI-SPOOFING

CROSS-REFERENCE TO RELATED APPLICATION(S) AND CLAIM OF PRIORITY

This application claims priority under 35 U.S.C. § 119(e) to U.S. Provisional Patent Application No. 62/830,625 filed on Apr. 8, 2019. The above-identified provisional patent application is hereby incorporated by reference in its entirety.

TECHNICAL FIELD

This disclosure relates generally to electronic devices. More specifically, this disclosure relates to radar-based face authentication anti-spoofing for determining access to an electronic device.

BACKGROUND

The use of mobile computing technology such as a portable electronic device has greatly expanded largely due to usability, convenience, computing power, and the like. One result of the recent technological development is that electronic devices are becoming more compact, while the number of functions and features that a given device can perform is increasing. For example, certain electronic devices not only provide voice call services using a mobile communication network, but can also offer video call services, messaging services, data transmission service, multimedia services, as well as provide content to a user. Some of the functions and features that an electronic device can perform, such as documents, files, programs, systems, and information, can include confidential and sensitive information, which require the electronic device to verify the user prior to providing access.

An electronic device can verify a user prior to allowing a user access to certain functions and features by authenticating the user. A user can input credentials such as a user identification and a password, which are specific to the content the user desires to access, for authentication purposes. Camera based face authentication methods can provide secure access for registered users of devices. However, camera-based face authentication methods provide hackers the ability to spoof a human face and gain access to the device.

SUMMARY

This disclosure provides methods and apparatuses for radar-based face authentication anti-spoofing for determining access to an electronic device.

In a first embodiment, an electronic device includes a radar transceiver and at least one processor. The at least one processor is configured to transmit, via the transceiver, a first set of signals, generate a channel impulse response (CIR) based on receipt of reflections of the first set of signals, detect a first CIR tap in the CIR, determine a selection of CIR data based on the detected first CIR tap, determine a profile matching metric based on comparison of the selection of CIR data to a set of predetermined reference signals, and determine whether to allow access to the electronic device based on comparison of the profile matching metric to a profile matching threshold.

In a second embodiment, a method to determine access to an electronic device includes transmitting, via a radar transceiver of the electronic device, a first set of signals, generating a CIR based on receipt of reflections of the first set of signals, detecting a first CIR tap in the CIR, determining a selection of CIR data based on the detected first CIR tap, determining a profile matching metric based on comparison of the selection of CIR data to a set of predetermined reference signals, and determining whether to allow access to the electronic device based on comparison of the profile matching metric to a profile matching threshold.

In a third embodiment, an electronic device includes a non-transitory computer readable medium. The non-transitory computer readable medium stores instructions that, when executed by the processor, cause the processor to transmit, via a radar transceiver of the electronic device, a first set of signals, generate a CIR based on receipt of reflections of the first set of signals, detect a first CIR tap in the CIR, determine a selection of CIR data based on the detected first CIR tap, determine a profile matching metric based on comparison of the selection of CIR data to a set of predetermined reference signals, and determine whether to allow access to the electronic device based on comparison of the profile matching metric to a profile matching threshold.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 8 illustrates a block diagram of an example method for detecting a human face versus a static object using a phase moving property calculation according to embodiments of this disclosure;

FIG. 9 illustrates a block diagram of another example method for detecting a human face versus an inanimate object using additional phase features of phase moving according to embodiments of this disclosure;

DETAILED DESCRIPTION

FIGS. 1 through 12, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
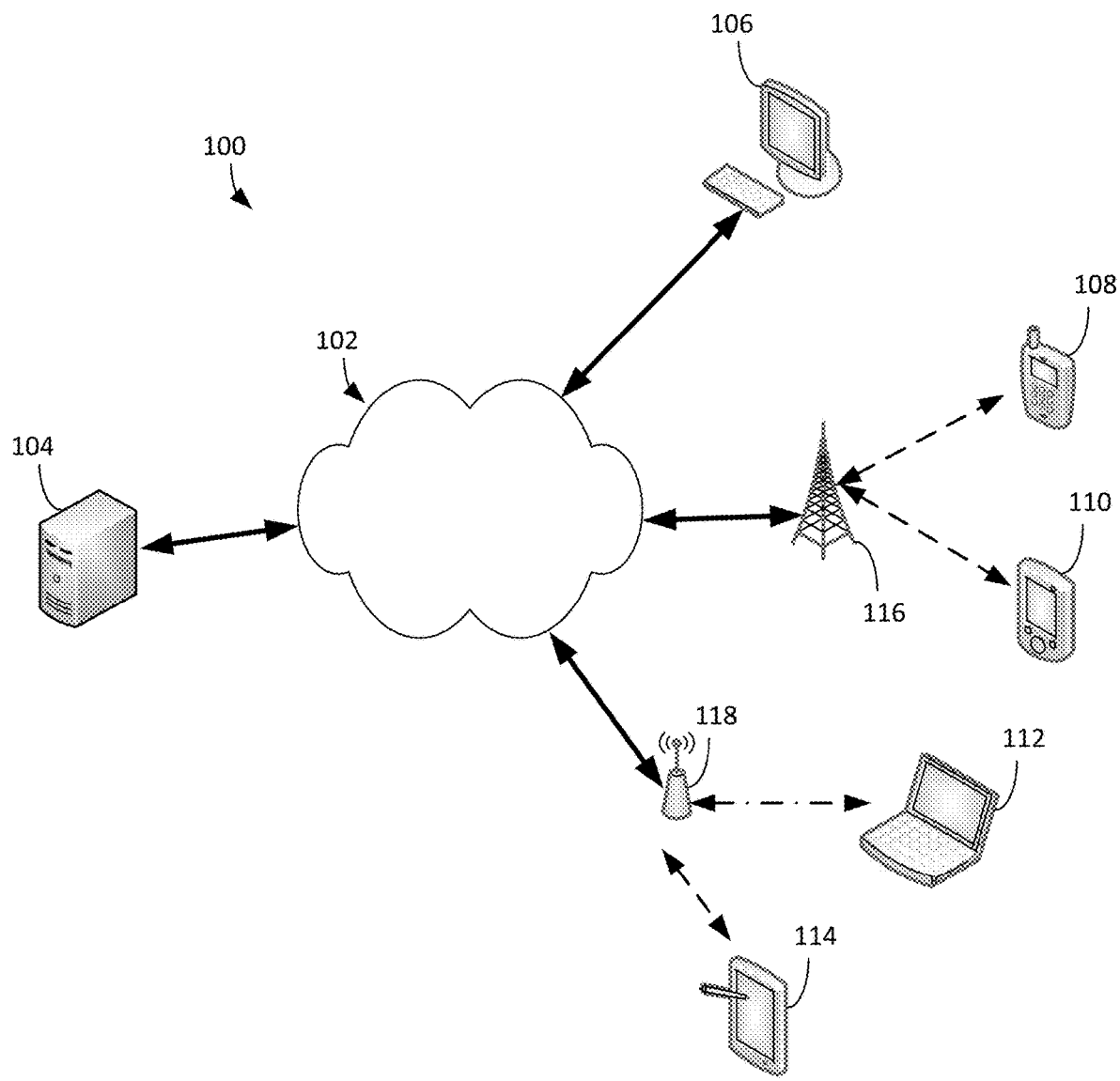
FIG. 1 illustrates an example communication system according to embodiments of this disclosure.

FIG. 1 illustrates an example communication system 100 according to embodiments of this disclosure. The embodiment of the computing system 100 shown in FIG. 1 is for illustration only. Other embodiments of the computing system 100 could be used without departing from the scope of this disclosure.

As shown in FIG. 1, the communication system 100 includes a network 102, which facilitates communication between various components in the communication system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals for face authentication, anti-spoofing and gesture recognition.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

In certain embodiments, any of the client devices 106-114 transmit information securely and efficiently to another device, such as, for example, the server 104. Also, any of the client devices 106-114 can trigger the information transmission between itself and server 104. Any of the client devices 106-114 can function radar emitter and collector for face authentication, anti-spoofing, and gesture recognition purposes. For example, any of the client devices 106-114 can collect and compare radar data of the user's face to preregistered radar data to authenticate the user's face as a real human face.

As described in more detail below, a radar-based learning solution uses raw signals received from different antenna pairs to perform face authentication, anti-spoofing, gesture recognition, or object recognition. Vision-based authentication use techniques to identify contours of a user's face and then crop those pixels from the raw images to perform face authentication. Radar provides additional information that camera-based authentication lacks. Namely, radar can provide depth information and material information. The radar-based learning solution uses tap detection to identify and select raw radar signals from a region of interest to determine whether a radar detected object is a human face. Deep learning algorithms and signal processing algorithms generate outputs signifying whether the radar detected object is a human face. The radar-based learning solution prevents the ability of a "fake" object (that is an object being presented as a human face) from overcoming the face authentication procedures of an electronic device. According to the embodiments of this disclosure, the radar-based learning solution can be applied to other regions of interest beyond human face recognition or authentication. For example, the radar-based learning solution can be applied to regions of interest including other body parts or objects.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
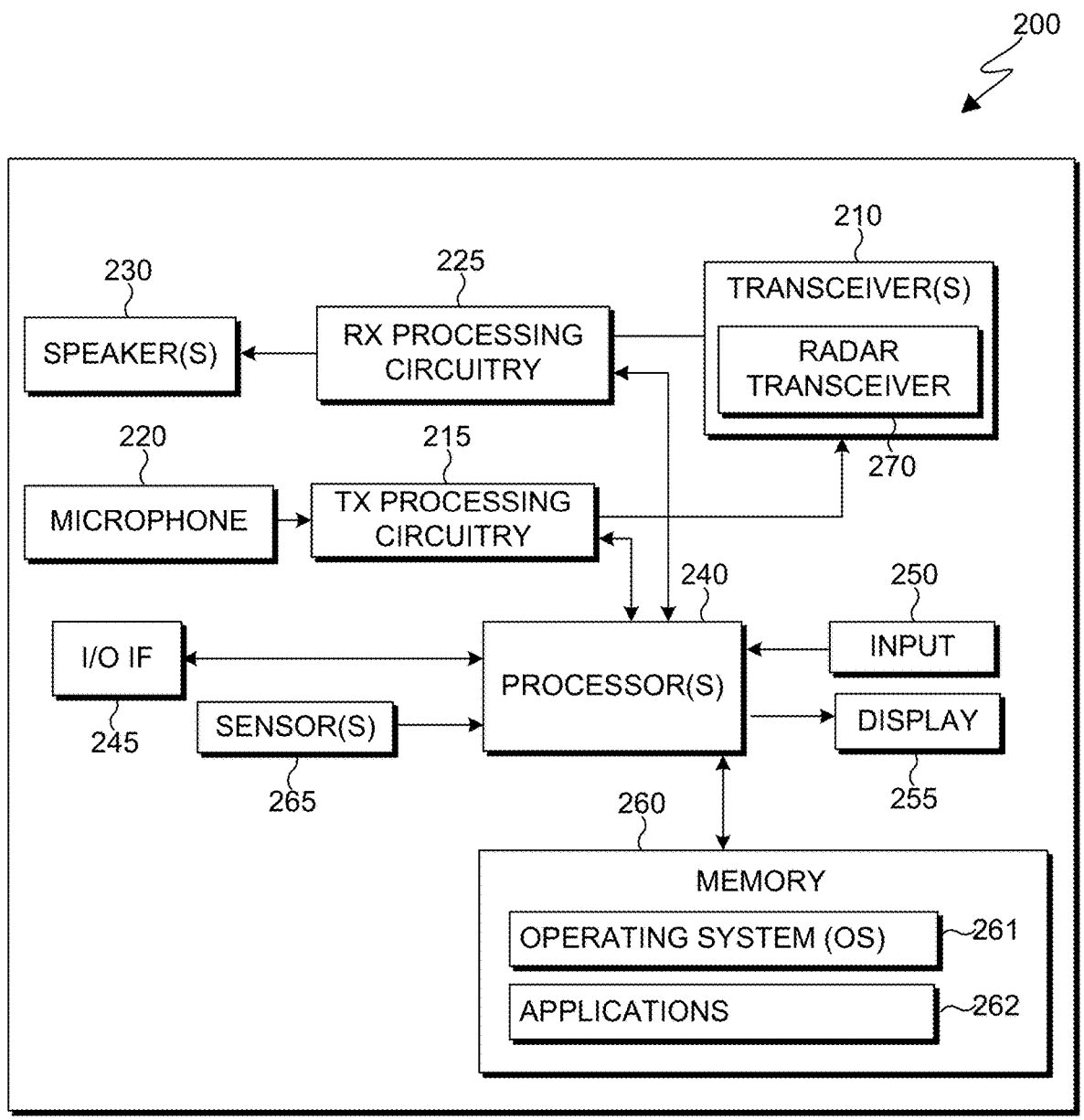
FIG. 2 illustrates an example electronic device according to embodiments of this disclosure.

FIG. 2 illustrates an example electronic device 200 according to embodiments of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WI-FI transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, a sensor(s) 265, and a camera 275. The memory 260 includes an operating system (OS) 261, and one or more applications 262.

The transceiver(s) 210 can include an antenna array including numerous antennas. The transceiver(s) 210 can transmit and receive a signal or power to or from the electronic device 200. The transceiver 210 transmits signals to other components in a system and receives incoming signals transmitted by other components in the system. For example, the transceiver 210 transmits and receives RF signals, such as BLUETOOTH or WI-FI signals, to and from an access point (such as a base station, WI-FI router, BLUETOOTH device) of a network (such as a WI-FI, BLUETOOTH, cellular, 5G, LTE, LTE-A, WiMAX, or any other type of wireless network). The received signal is processed by the RX processing circuitry 225. The RX processing circuitry 225 may transmit the processed signal to the speaker 230 (such as for voice data) or to the processor 240 for further processing (such as for web browsing data). The TX processing circuitry 215 receives voice data from the microphone 220 or other outgoing data from the processor 240. The outgoing data can include web data, e-mail, or interactive video game data. The TX processing circuitry 215 processes the outgoing data to generate a processed signal. The transceiver 210 receives the outgoing processed signal from the TX processing circuitry 215 and converts the received signal to an RF signal that is transmitted via an antenna. In other embodiments, the transceiver 210 can transmit and receive radar signals to detect the potential presence of an object in the surrounding environment of the electronic device 200.

In this embodiment, one of the one or more transceivers in the transceiver 210 includes is a radar transceiver 270 configured to transmit and receive signals for detection and ranging purposes. For example, the radar transceiver 270 may be any type of transceiver including, but not limited to a WiFi transceiver, for example, an 802.11ay transceiver. The radar transceiver 270 includes an antenna array that includes transmitter and receiver antenna arrays. The radar transceiver 270 can transmit signals at a frequency less than or equal to 100 GHz. For example, the transmitter 157 can transmit signals at frequencies including, but not limited to, 6-8 GHz, 28 GHz, 39 GHz, 60 GHz, and 77 GHz. In some embodiments, the signals transmitted by the radar transceiver 270 can include, but are not limited to, millimeter wave (mmWave) signals. The radar transceiver 270 can receive the signals, which were originally transmitted from the radar transceiver 270, after the signals have bounced or reflected off of target objects in the surrounding environment of the electronic device 200. The processor 240 can analyze the time difference between when the signals are transmitted by the radar transceiver 270 and received by the radar transceiver 270 to measure the distance of the target objects from the electronic device 200.

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the RF transceiver 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include an authentication program as well as a program or file that requires authentication prior to accessing.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265 and/or a camera by providing additional input to the processor 240. In certain embodiments, the sensor 265 includes one or more inertial measurement units (IMUs) (such as accelerometers, gyroscope, and magnetometer), motion sensors, optical sensors, cameras, pressure sensors, heart rate sensors, altimeter, and the like. The input 250 can also include a control circuit. In the capacitive scheme, the input 250 can recognize touch or proximity. In certain embodiments, the input 250 includes the antenna 205 which can emit and recite radar signals for authenticating a user.

The display 255 can be a liquid crystal display (LCD), light-emitting diode (LED) display, organic LED (OLED), active matrix OLED (AMOLED), or other display capable of rendering text and/or graphics, such as from websites, videos, games, images, and the like. The display 255 can be sized to fit within a HMD. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc. The memory 260 also can sensitive and confidential information, which require user authentication prior to accessing.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200, within a secondary device operably connected to the electronic device 200, within a headset configured to hold the electronic device 200, or in a singular device where the electronic device 200 includes a headset.

In certain embodiments, the radar transceiver 270 can include a transmitter and a receiver. The transmitter can transmit millimeter wave (mmWave) signals. The receiver can receive the mmWave signals originally transmitted from the transmitter after the mmWave signals have bounced or reflected off of target objects in the surrounding environment of the electronic device 200. The processor 240 can analyze the time difference between when the mmWave signals are transmitted and received to measure the distance of the target objects from the electronic device 200. Based on the time differences, the processor 240 can generate an image of the object by mapping the various distances.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices, including, for example, without limitation a robot.

Figure 3:
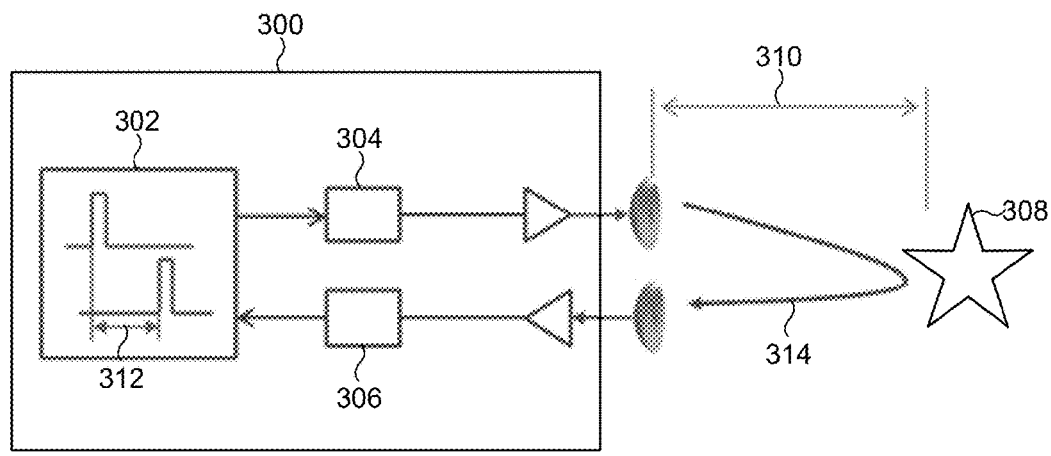
FIG. 3 illustrates an example architecture of a monostatic radar according to embodiments of this disclosure.

FIG. 3 illustrates an example architecture of a monostatic radar according to embodiments of this disclosure. The embodiment of FIG. 3 is for illustration only. Other embodiments can be used without departing from the scope of the present disclosure.

FIG. 3 illustrates an electronic device 300 that includes a processor 302, a transmitter 304 and a receiver 306. The electronic device 300 can be similar to any of the client devices 106-114 of FIG. 1, the server 104 of FIG. 1, or the electronic device 200 of FIG. 2. The processor 302 is similar to the processor 240 of FIG. 2. Additionally, the transmitter 304 and the receiver 306 can be similar to the radar transceiver 270 of FIG. 2.

The transmitter 304 transmits a radar signal 314 to a target 308 a distance 310 away. In certain embodiments, the target 308 is the user face 320 when the electronic device 300 is performing face authentication anti-spoofing.

Monostatic radar is characterized for its delayed echo as the transmitter 304 of the radar signal and the receiver 306 of the radar signal are essentially at the same location. In certain embodiments the transmitter 304 and the receiver 306 are co-located either by using a common antenna or nearly co-located but use separate but adjacent antennas. Monostatic radars are assumed coherent such that the transmitter 304 and the receiver 306 are synchronized via a common time reference 312.

A pulse radar is generated as a realization of a desired radar waveform, modulated onto a radio carrier frequency and transmitted through a power amplifier and antenna. For example, FIG. 3 illustrates a parabolic antenna. In certain embodiments, the antenna is omnidirectional. In other embodiments, the antenna is focused into a particular direction. When the target 308 is within the field of view of the transmitted signal and within a distance 310 from the radar location, then the target 308 will be illuminated by RF power density, $p_t$, for the duration of the transmission. Equation (1) describes the first order of the power density, $p_t$.

$$p_t = \frac{P_T}{4\pi R^2} G_T = \frac{P_T}{4\pi R^2} \frac{A_T}{(\lambda^2/4\pi)} = P_T \frac{A_T}{\lambda^2 R^2} \quad \text{Equation (1)}$$

Referring to Equation 1, $P_T$ is the transmit power (Watts). $G_T$ and $A_T$ describe the transmit antenna gain (dBi) for an effective aperture area (m$^2$). $\lambda$ corresponds to the wavelength of the radar signal RF carrier signal (m), and R corresponds to the distance (m) 310 between the antenna and the target 308. In certain embodiments, effects of atmospheric attenuation, multi-path propagation, antenna loss and the like are negligible.

The transmit power density impinging onto the target 310 surface can cause reflections depending on the material, composition, surface shape and dielectric behavior at the frequency of the radar signal. In certain embodiments, only direct reflections contribute to a detectable receive signal since off-direction scattered signals can be too weak to be received by at the radar receiver. The illuminated areas of the target with normal vectors pointing back at the receiver can act as transmit antenna apertures with directives (gains) in accordance with their effective aperture areas. Equation (2), below, describes the reflective back power.

$$P_{ref1} = p_t A_t G_t \sim p_t A_t r_t \frac{A_t}{\lambda^2/4\pi} = p_t RSC \quad \text{Equation (2)}$$

In Equation 2, $P_{ref1}$ describes the effective isotropic target-reflected power. The term, $A_t$ described the effective target area normal to the radar direction, the term $r_t$ describes the reflectivity of the material and shape, while the term $g_t$ describes the corresponding aperture gain. RSC is the radar cross section which is an equivalent area that scales proportional to the actual reflecting area-squared inversely proportional with the wavelength-squared and is reduced by various shape factors and the reflectivity of the material itself. Due to the material and shape dependency, it is difficult to deduce the actual physical area of a target from the reflected power, even if the distance 310 to the target 308 is known.

The target reflected power at the receiver location results from the reflected power density at the reverse distance 310 collected over the receiver antenna aperture area. Equation (3), below, describes the received target reflected power. It is noted that $P_R$ is the received target reflected power and $A_R$ is the receiver antenna effective aperture area. In certain embodiments, $A_R$ is the same as $A_r$.

$$P_R = \frac{P_{ref1}}{4\pi R^2} A_R = P_T \cdot RSC \frac{A_T A_R}{4\pi \lambda^2 R^4} \quad \text{Equation (3)}$$

A radar system can be used as long as the receiver signal exhibits sufficient signal-to-noise ratio (SNR). The value of SNR depends on the waveform and detection method. Equation (4), below, describes the SNR. It is noted that kT is the Boltzmann constraint multiplied by the current temperature. B is the radar signal bandwidth in Hz. F is the receiver noise factor which is a degradation of the receiver signal SNR due to noise contributions of the receiver circuit itself.

$$SNR = \frac{P_R}{kT \cdot B \cdot F} \quad \text{Equation (4)}$$

When the radar signal is a short pulse of duration, $T_p$, the delay 312 between the transmission and reception of the corresponding echo is described in Equation (5). $\tau$ corresponds to the delay 312 and c is the speed of light propagation in the air. When there are multiple targets at different distances, individual echoes can be distinguished only if the delays differ by at least one pulse width. As such, the range resolution of the radar is described in Equation (6). A rectangular pulse of a duration $T_p$ exhibits a power spectral density as described in Equation (7) and includes a first null at its bandwidth as shown in Equation (8). The range resolution of a radar signal fundamental connected with the bandwidth of the radar waveform is expressed in Equation (9).

$\tau = 2R/c$      Equation (5):

$\Delta R = c\Delta\tau/2 = cT_p/2$      Equation (6):

$P(f) \sim (\sin(\pi f T_p)/(\pi f T_p))^2$      Equation (7):

$B = 1/T_p$      Equation (8):

$\Delta R = c/2B$      Equation (9):

In certain types of radar-based learning solutions, such as face authentication, anti-spoofing, gesture recognition, or object recognition, raw received signals from different antenna pairs are used as the input. According to embodiments of this disclosure, radar signals relevant for face authentication, and the like, are extracted from the raw received signals.

Figure 4:
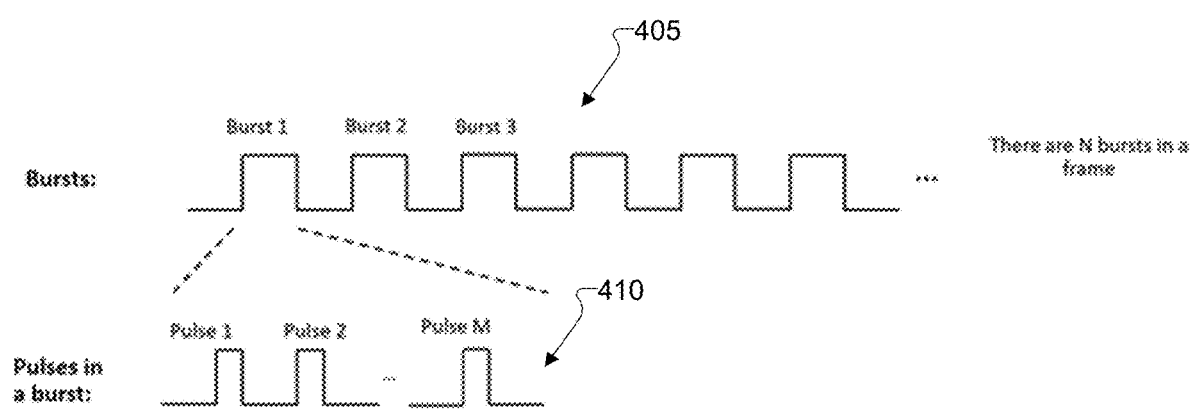
FIG. 4 illustrates a timing diagram for radar transmission according to embodiments of this disclosure.

FIG. 4 illustrates a timing diagram for radar transmission according to embodiments of this disclosure. The embodiment of FIG. 4 is for illustration only. Other embodiments can be used without departing from the scope of the present disclosure.

In particular, FIG. 4 illustrates a frame structure that divides time into frames that each comprise multiple bursts 405. Each burst 405 includes a plurality of pulses. As illustrated in FIG. 4, each frame includes a number N bursts 405, such as Burst 1, Burst 2, Burst 3, etc. Each burst 405 further includes a plurality of pulses 410. For example, FIG. 4 illustrates that Burst 1 comprises a plurality of pulses 410 referenced as Pulse 1, Pulse 2, etc. through Pulse M.

For example, in Burst 1 a radar transmitter, such as the transmitter 304, can transmit Pulse 1, Pulse 2, and Pulse M. In Burst 2, the radar transmitter 304 can transmit similar pulses Pulse 1, Pulse 2, and Pulse M. Each different pulse (Pulse 1, Pulse 2, and Pulse M) and burst (Burst 1, Burst 2, Burst 3, etc.) can utilize a different transmission/reception antenna configuration to identify the specific pulses 410 and bursts 405. For example, each pulse or burst can utilize a different active set of antenna elements and corresponding analog/digital beamforming weights to identify specific pulses 410 and bursts 405. Each of the N bursts 405 repeat the same pulses 410 and therefore all the signals from all the pulses 410 within a burst 405 provide a complete scan of the radar field of view, and the repetitions across the bursts 405 provide a way to capture the temporal variation (i.e., the Doppler information). Although the spacing between the pulses 410 and bursts 405 as illustrated in FIG. 4 are uniform, the spacing does not need to be uniform and any choice of the spacing may be used.

The processor 300 takes the raw received signals from the pulse compression radar measurement and creates a Channel Impulse Response (CIR). The CIR is a metric for pulsed radar operation that is a measure of the strength of a reflected signal as a function of distance. The CIR can be a three-dimensional matrix populated with complex numbers. According to embodiments of this disclosure, the first dimension can correspond to a burst index K, the second dimension can correspond to a pulse index M, and the third dimension can correspond to a tap index L that measures range or time of flight of the received signal.

Figure 5:
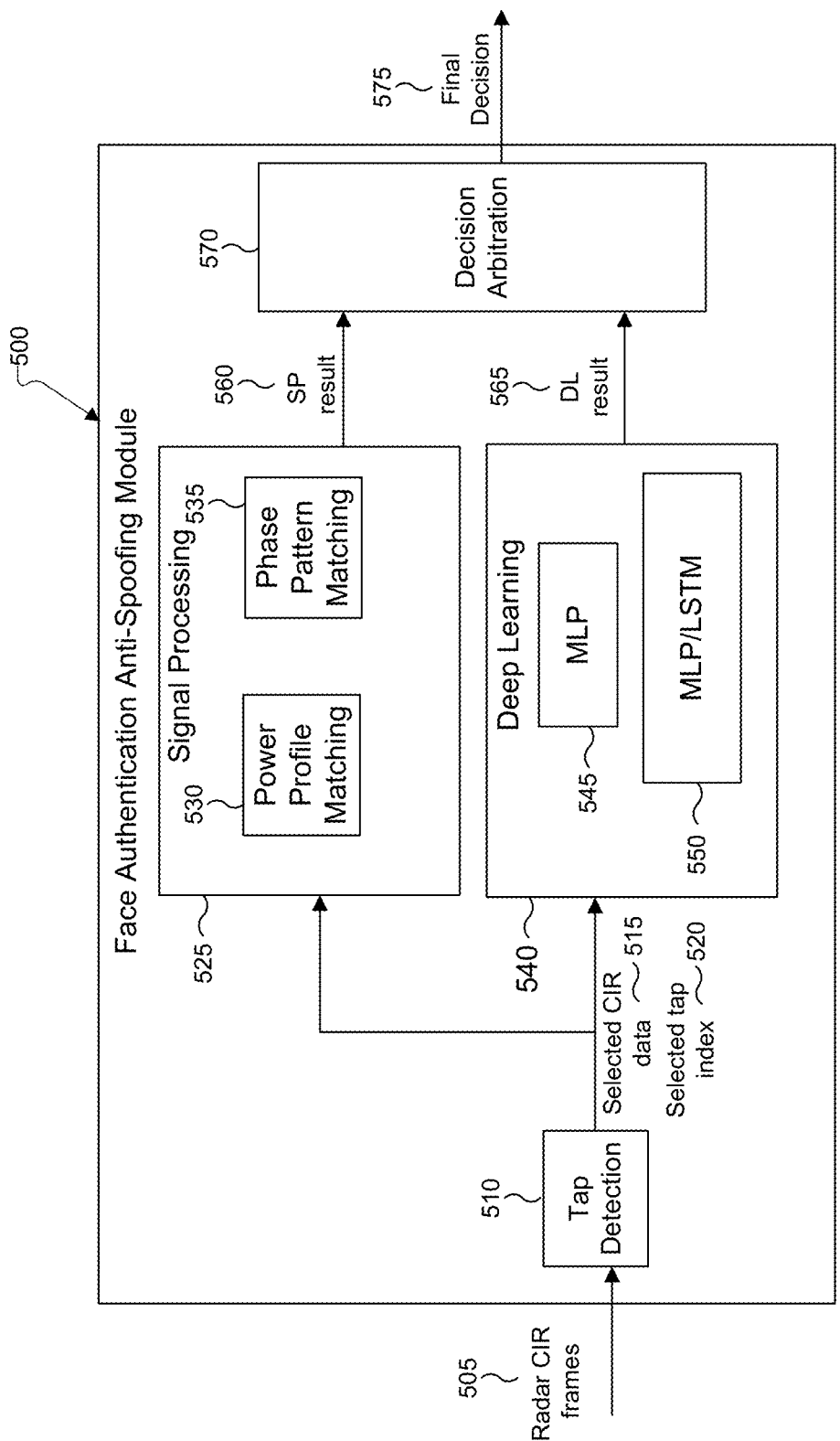
FIG. 5 illustrates an example architecture for performing face authentication anti-spoofing to determine access to an electronic device using radar data according to embodiments of this disclosure.

FIG. 5 illustrates an example architecture 500 for performing face authentication anti-spoofing to determine access to an electronic device 200 using radar data according to embodiments of this disclosure. The embodiment of FIG. 5 is for illustration only. Other embodiments can be used without departing from the scope of the present disclosure.

Referring to the non-limiting example of FIG. 5, radar CIR frames 505 are input into the face authentication anti-spoofing module 500. The number of CIR frames 505 input can vary. For example, in low latency mode, one frame (N=1) is provided as the input. In high performance mode, multiple frames are input (N>1). Each frame includes M pulses (corresponding to antenna pairs), K bursts, and L delay taps, totaling M×K×L elements.

The CIR frames 505 are input to the tap detection module 510. The tap detection module 510 detects in which CIR taps the object information exits. For example, the tap detection module 510 analyzes the CIR tap data to determine a first tap having an amplitude above a predefined amplitude threshold. The tap detection module 510 then selects a predefined number of taps following the first tap exceeding the predefined amplitude threshold. For example, the predefined number of taps can be equivalent to an average number of taps known to correspond to the radar detection of a human head.

The selected CIR data 515 along with a selected tap index 520 is input to a signal processing module 525 and a deep learning module 540 in parallel. The selected tap index 520 corresponds to the range of the selected CIR taps. In the signal processing module 525, different features are extracted and used for identifying if the radar CIR frames 505 corresponds to a human face. The signal processing module 525 includes a power profile matching sub-module 530 and a phase pattern matching sub-module 535 which each perform different calculations on the selected CIR data 515 for face authentication anti-spoofing. The method performed by the power profile matching sub-module 530 is explained in more detail with reference to FIG. 5 below. The method performed by the phase pattern matching sub-module 535 is explained in more detail with reference to FIGS. 8 and 9 below.

In the deep learning module 540, a neural network is used to classify the selected CIR data 515 as from a human face or not. For example, Multiple Layer Perception (MLP) 545 can be used for low latency mode. MLP or Long Short-Term Memory (LSTM) 550 can be used for high performance mode.

The signal processing module 525 outputs a signal processing (SP) result or decision 560 and the deep learning module 540 outputs a deep learning (DL) result or decision 565. The SP result 560 and the DLM 565 are input to the decision arbitration module 570. The decision arbitration module 570 determines a final decision 575 regarding whether or not the radar detected object is a human face. If the SP result 560 indicates that the radar detected object is not a human face, then the final decision 575 is that the object is not a human face. If the SP result 560 indicates that the radar detected object is a human face, then the decision arbitration module 570 ignores the SP result 560 and relies on the DL result 565 to determine whether or not the radar detected object is a human face. For example, if the SP result 560 indicates that the radar detected object is a human face but the DL result 565 determines that the object is not a human face the final decision 575 is that the object is not a human face.

Although FIG. 5 illustrates one example of an architecture 500 performing face authentication anti-spoofing using radar data, various changes may be made to FIG. 5. For example, the deep learning model 635 can be implemented using any other suitable deep learning-based machine learning algorithm, such as Convolution Neural Network (CNN) or CNN-LSTM or other machine learning algorithms or combination thereof. Also, the architecture 500 shown in FIG. 5 could be implemented in any suitable manner, such as entirely within an electronic device 101 or using a combination of devices. For instance, an electronic device 200 could collect the radar CIR frames 510 and provide the radar CIR frames 510 to a server 104, which could then process the data as shown in FIG. 5. Results of the processing could then be made available to the electronic device 101 or 200 and/or one or more other devices (such as the electronic device 102 or 104).

Figure 6:
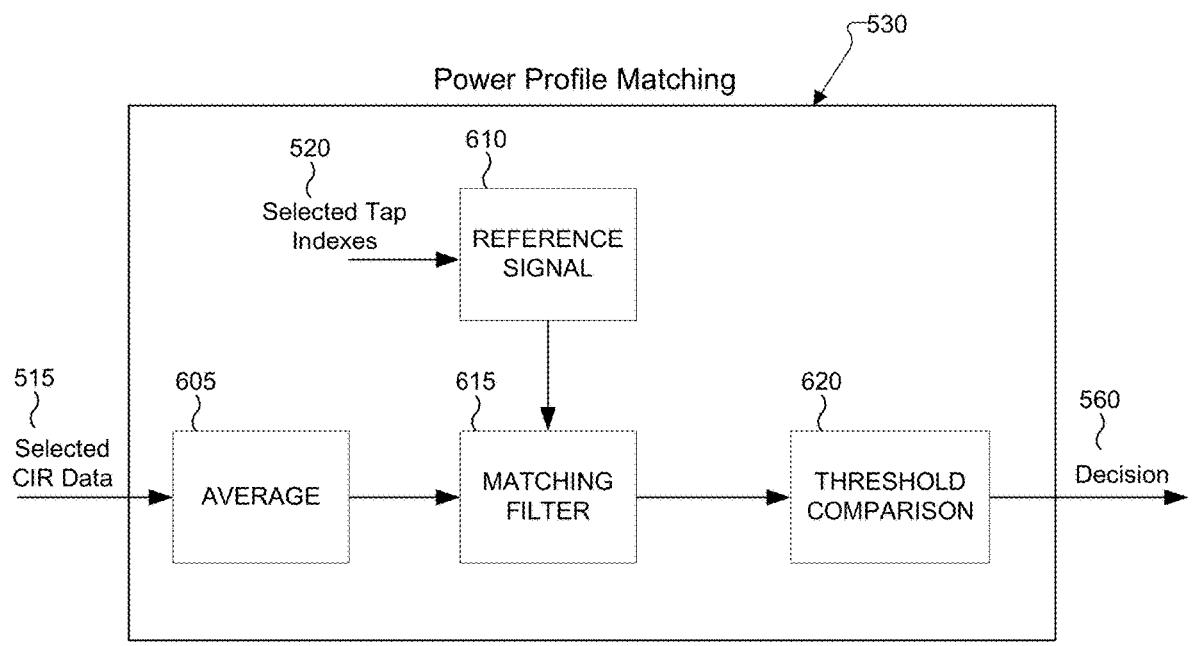
FIG. 6 illustrates an example architecture of the power profile matching sub-module for determining access to an electronic device according to embodiments of this disclosure.

FIG. 6 illustrates an example architecture of the power profile matching sub-module 530 for determining access to an electronic device 200 according to embodiments of this disclosure. For example, objects with different shapes and constructed from different materials would have power profiles that vary. The power profile matching sub-module 530 can distinguish between objects that are not human faces and can even distinguish between a registered user's face and other human faces. The embodiment of FIG. 6 is for illustration only. Other embodiments can be used without departing from the scope of the present disclosure.

Referring to the non-limiting example of FIG. 6, the average sub-module 605 calculates an average of the selected CIR data 515 as output from the tap detection module 510. The selected CIR data 515 is averaged over different antenna pairs, different bursts, and different frames. The averaging operation produces a vector $S_i$ with a length of $L_s$.

The reference signal sub-module 610 selects a set of reference signals according to selected tap indexes, or a first selected tap index. The reference signal module 610 stores a set of predetermined reference signals that are labeled according to different selected tap indexes or the first selected tap index. The method performed by the reference signal sub-module 610 to create and store predetermined reference signals is explained in more detail with reference to FIG. 7 below.

In the matching filter sub-module 615, the CIR data vector $S_i$ is compared to each of the predetermined reference signals to determine a profile matching metric $m_k$. Equation (10), below, describes the profile matching metric $m_k$, wherein $S_i$ is the CIR data vector or input vector element and $R_{k,i}$ is the kth predetermined reference signal vector element.

$$m_k = \sum_{i=1}^{L_s} |S_i - R_{k,i}| \qquad \text{Equation (10):}$$

Another way to determine the profile matching metric $m_k$ is to convert the input vector $S_i$ and $R_{k,i}$ into dB scale. Equation (11) below defines the profile matching metric, where p can be any real number.

$$m_k = \sum_{i=1}^{L_s} |S_i - R_{k,i}|^p \qquad \text{Equation (11):}$$

In the threshold comparison sub-module 620, the profile matching metric ($m_k$) is compared to a predefined profile matching threshold. If the profile matching metric is greater than the predefined profile matching threshold then the decision 560 of the power profile matching sub-module 530 is that the radar detected object is not authenticated. That is, the radar detected object either is not human or the human face that is detected does not belong to the registered user of the electronic device 200 if the profile matching metric is greater than the predefined profile matching threshold. The electronic device 200 determines that access should not be granted if the decision 560 is that the radar detected object is not authenticated.

Although FIG. 6 illustrates one example of an architecture of the power profile matching sub-module 530 for determining whether the power profile of a radar detected object matches a reference signal, various changes may be made to FIG. 6. For example, the threshold checking can be replaced with a neural network analysis such as described in reference to FIG. 10. Also, the architecture 530 shown in FIG. 6 could be implemented in any suitable manner, such as entirely within an electronic device 200 or using a combination of devices. For instance, a server 104 could collect and store the predetermined reference signal sets and share the predetermined reference signal sets with the reference signal module 610 on the electronic device 101 or 200 and/or one or more other devices (such as the electronic device 102 or 104).

Figure 7:
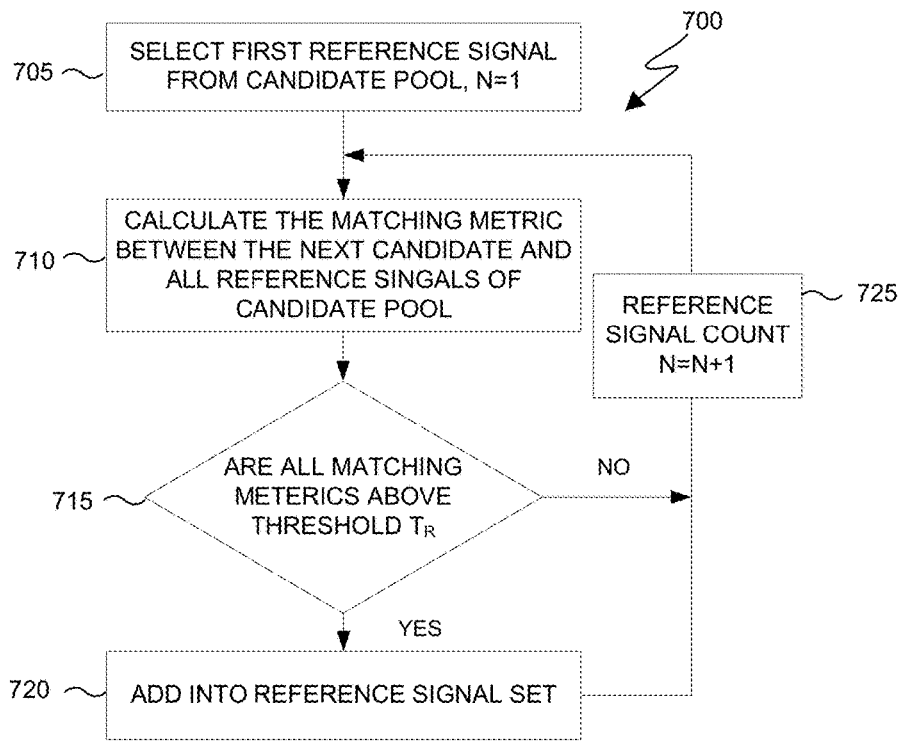
FIG. 7 illustrates a block diagram of an example method for generating a reference signal set according to embodiments of this disclosure.

FIG. 7 illustrates a block diagram of an example method 700 for generating a reference signal set according to embodiments of this disclosure. The first step in generating a reference signal set it to collect radar data from the user that is to be a registered user of the electronic device 200. During the registration process the user interface of the electronic device 300 can direct the user to move the user's head to cover a range of interest (ROI) and direct the user to shift the user's face to different angles within the ROI. For example, the user can be instructed to start the registration process with the electronic device 200 very close to the user's face (i.e., closer than 20 cm) and slowly move the electronic device away from the face to (i.e., further than 50 cm). While the electronic device is moving away from the face of the user, the user can also slowly turn their head left and right, back and forth, and up and down to capture all angles. The radar transceiver 270 transmits radar signals toward the user during this process. The processor 240 collects all the data and stores it in the memory 260 of the electronic device 200. The collected data passes through a tap detection module like the one described in reference to FIG. 5. After tap detection each frame is labeled according to its tap index. For example, if tap detection determines that the first tap of a frame to exceed a certain amplitude occurs at index 4 that frame will be labeled index 4. The tap detection module processes each frame to determine all the frames that have a first tap index of 4 and labels those frames accordingly. All the frames with the same tap index label of 4 become a candidate pool for label 4. Each candidate pool runs through the method 700 as illustrated in FIG. 7.

In block 705, a first reference signal (N=1) from a first candidate pool is selected. N is the reference signal index. In block 710, matching metrics are calculated between the first reference signal of the candidate pool and the next reference signal (N+1) of the candidate pool and then the next reference signal (N+2) of the candidate pool until a matching metric is calculated between the first reference signal (N=1) and all the reference signals of the candidate pool (N+1 . . . N=i, where i is the total number of reference signals of the candidate pool). The matching metrics are calculated using Equation 10 or Equation 11 as explained above. In block 715, the matching metrics are compared to a predetermined threshold metric $T_R$. If all the matching metrics are above the threshold metric $T_R$ then in block 720 the first reference signal (N=1) is added to the reference signal set. If the matching metric is not above the threshold metric $T_R$ then the process flows back to block 710. In block 725, the reference signal index N increases so that the second reference signal (N=2) is then compared to the following reference signal (N+1) of the candidate pool and then the next reference signal (N+2) of the candidate pool until a matching metric is calculated between the second reference signal (N=1) and all the reference signals of the candidate pool. The process repeats until the matching metrics of the reference signals (N=i) are compared to each other to determine if they belong to the reference signal set. signal (N) compared to all the reference signals of the candidate pool. Through the process illustrated in FIG. 7, reference signals are compared against each other so as to eliminate duplicate signals and create a signal set that captures all the angles and features of the human face.

Once again, the method shown in FIG. 7 could be implemented in any suitable manner, such as entirely within an electronic device 200 or using a combination of devices. For instance, an electronic device 200 could collect data and provide the data to a server 104, which could then process the data and generate the reference signal set. According to embodiments of this disclosure the method illustrated in FIG. 7 could also be applied to a large collection of human face radar signals that are collected from a plurality of faces across a plurality of electronic devices. In this manner, reference signal sets can be available to electronic devices without a user having to perform the registration process on the user's electronic device.

Although FIG. 7 illustrates one example of a method 700 to generate a reference signal set, various changes can be made to FIG. 7. For example, various steps in FIG. 7 could overlap, occur in parallel, occur serially, occur in a different order, or occur any number of times.

FIG. 8 illustrates a block diagram of an example method 800 for detecting a human face versus a static object using a phase moving property calculation according to embodiments of this disclosure. For example, the human face possesses a consistent state of micro-movements in that breathing and other physiological occurrences cause the human face to always be moving. These physiological changes can be detected through radar collected data analysis of phase changes. A static, non-moving object would have a stable, non-changing, phase. Therefore, if the phase moving matches a static object the decision is made that the radar data collected is not of human face. Method 800 can be performed by the phase pattern matching module 535 of FIG. 5.

In block 810 the selected CIR data frames 515 (as collected by the tap detection module of FIG. 5) are concatenated. For example, each frame includes M pulses (antenna pairs), K burst, L delay taps which result in M×K×L elements. After concatenation, there are M×KN×L elements for N frames.

In block 820 phase differentiation is performed on the concatenated data. The phase differentiation is done in burst/frame dimensions by using Equation (12).

$$D_i = \text{Angle}(X_{i+1} * \text{conj}(X_i)) \qquad \text{Equation (12):}$$

After phase differentiation, the output dimension becomes M×(KN−1)×L.

Next, in block 830 the mean value of the phase difference is calculated.

According to embodiments of this disclosure two different means can be calculated: mean($X_i$) or mean(abs($X_i$)). The averaging operation can apply over KN−1 or M×(KN−1) or M×(KN−1)×L.

In block 840, the mean value is checked against a predefined phase moving threshold. If the mean value is smaller than the phase moving threshold, then it is not a live human and the decision 560 output is that the radar detected object is a fake. The electronic device 200 will not allow access based on the decision 560.

The method shown in FIG. 8 could be implemented in any suitable manner, such as entirely within an electronic device 200 or using a combination of devices. For instance, an electronic device 200 could collect data and provide the data to a server 104, which could then process the data and share it with the electronic device 200. Although FIG. 8 illustrates one example of a method 800 to determine a phase moving property of a radar detected object, various changes can be made to FIG. 8. For example, various steps in FIG. 8 could overlap, occur in parallel, occur serially, occur in a different order, or occur any number of times.

FIG. 9 illustrates a block diagram of another example method 900 for detecting a human face versus an inanimate object using additional phase features of phase moving according to embodiments of this disclosure. For example, the method 900 can detect if it if a human face or it is a handheld object such as a picture or sculpture of a human face. Extracting these additional phase moving features requires a relatively long-time span and thus it works best for the high-performance mode, according to embodiments of this disclosure. Method 900 can be performed by the phase pattern matching module 535 of FIG. 5.

In block 910 the selected CIR data 515 is concatenated by frames. The concatenated data dimension is M×KN×$L_s$. In block 920 the phase of the concatenated CIR data is calculated. The phase can be unwrapped phase or normal phase according to embodiments of this disclosure. In block 930 a Fourier transform, such as Fast Fourier Transform (FFT) algorithm is applied to the burst domain with FFT size $N_F$. The data dimension becomes M×$N_F$×$L_s$. There are two features from this frequency data, which can be used for face authentication anti-spoofing: a minimal phase variance and a sum of the amplitude.

In block 940, the variance of different antennas pairs for each frequency component and tap ($N_F$×$L_s$) is calculated. Then a minimal phase variance $$\min_{N_F \times L_S} (\text{var}(X_{m,n_F,l}))$$

is calculated to find the minimal value across frequency component and taps, where $X_{m,n_F,l}$ is the FFT output.

Alternatively, in block 940 a sum of the amplitude $\Sigma_{M \times N_F \times L_S} |X_{m,n_F,l}|$ is calculated, where $X_{m,n_F,l}$ is the FFT output.

In block 950 the additional features of the minimal phase variance or the sum of the amplitude is compared to a predefined phase moving threshold value, such as a minimal phase variance threshold or a sum or the amplitude threshold. If the minimal phase variance is greater than a minimal phase variance threshold value then the decision output 560 is that the radar detected object is not a human face, but something fake. If the sum of the amplitude is greater than a sum of the amplitude threshold value, then the decision output 560 is that the radar detected object is not a human face but something fake. The processor 240 of the electronic device 200 determines not to allow access to the electronic device 200 based on the decision output 560 that the radar detected object is fake. Alternatively, the processor 240 determines to allow access to the electronic device when the decision output 560 is that it is a human face.

The method shown in FIG. 9 could be implemented in any suitable manner, such as entirely within an electronic device 200 or using a combination of devices. For instance, an electronic device 200 could collect data and provide the data to a server 104, which could then process the data and share it with the electronic device 200. Although FIG. 9 illustrates one example of a method 900 to determine additional phase moving properties of a radar detected object, various changes can be made to FIG. 9. For example, various steps in FIG. 9 could overlap, occur in parallel, occur serially, occur in a different order, or occur any number of times.

Figure 10:
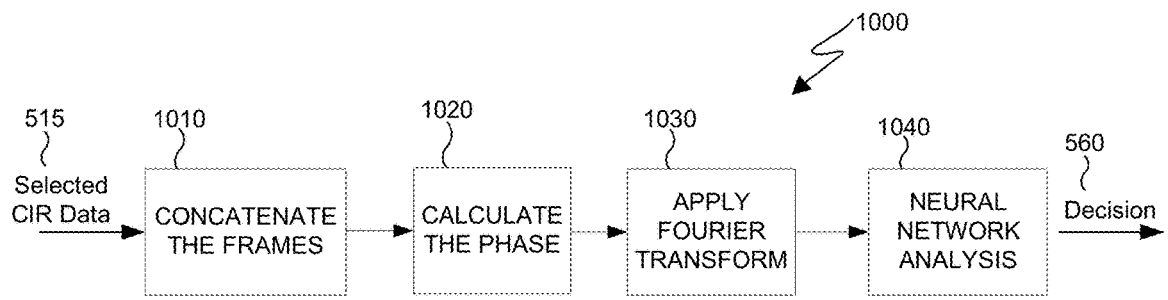
FIG. 10 illustrates a block diagram of an alternative example method for calculating additional phase features of phase moving using a neural network according to embodiments of this disclosure.

FIG. 10 illustrates a block diagram of an alternative example method 1000 of calculating additional phase features of phase moving using a neural network, according to embodiments of this disclosure. The processes in blocks 1010, 1020 and 1030 of concatenating the frames, calculating the phase and applying FFT to the frames is the same as the methods described in FIG. 9, in blocks 910, 920 and 930 and have been omitted in the description of FIG. 10.

After applying Fourier transform to the burst domain, the output $X_{m,n_F,l}$ is input to a neural network in block 1040. The neural network is trained to analyze the data and make a prediction whether or not the radar detected object is a human face. According to embodiments, the neural network can be a convolution neural network (CNN)-based deep learning model or other machine learning algorithms. If the decision 560 is that it is not a human face, the processor 240 will not allow access to the electronic device 200. If the decision 560 is that it is a human face, the processor 240 will determine that access to the electronic device 200 should be granted.

The method shown in FIG. 10 could be implemented in any suitable manner, such as entirely within an electronic device 200 or using a combination of devices. For instance, an electronic device 200 could collect data and provide the data to a server 104, which could then process the data and share it with the electronic device 200. Although FIG. 10 illustrates one example of a method 1000 to determine additional phase moving properties of a radar detected object, various changes can be made to FIG. 10. For example, various steps in FIG. 10 could overlap, occur in parallel, occur serially, occur in a different order, or occur any number of times.

Figure 11:
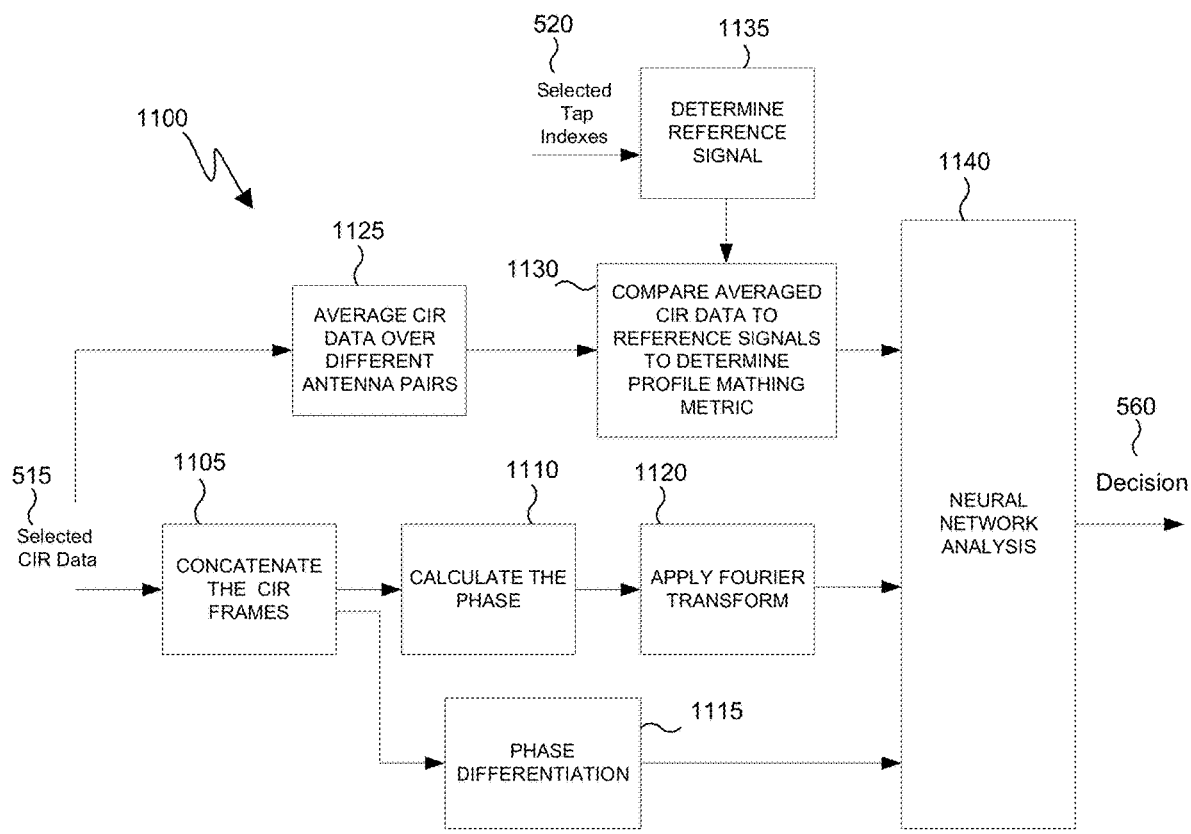
FIG. 11 illustrates a block diagram of an example method to determine access to an electronic device 200 using a neural network to analyze the profile matching metric, the calculated phase differences and a result of applying FFT to a phase according to embodiments of this disclosure.

FIG. 11 illustrates a block diagram of an example method 1100 to determine access to an electronic device 200 using a neural network to analyze the profile matching metric, the calculated phase differences and a result of applying FFT to a phase, according to embodiments of this disclosure. The method 1100 combines the methods and features of FIGS. 6, 8 and 9 and therefore processes that are substantially similar will be summarized and only changes to the methods or features will be discussed in detail with reference to FIG. 11.

Referring to the non-limiting example of FIG. 11, selected CIR data 515 is averaged over different antenna pairs in block 1125 to produce a vector $S_i$. The vector $S_i$ is compared to each of the predetermined reference signals (created or stored in block 1135 from selected tap indexes 520) to determine a profile matching metric $m_k$ in block 1130. The profile matching metric is input to the neural network in block 1140. In block 1105 the selected CIR data is concatenated. In block 1100 the phase of the concatenated CIR data is calculated. In block 1120 a Fourier transform (FFT) is applied to the phase of the concatenated data. The FFT result is input to the neural network in block 1140. In block 1115, phase differentiation is also applied to the concatenated frames. The phase differentiation or calculated phase differences is input to the neural network in block 1140. The neural network is trained to analyze the data and make a prediction whether or not the radar detected object is a human face. According to embodiments, the neural network can be a convolution neural network (CNN)-based deep learning model or other machine learning algorithms. If the decision 560 is that it is not a human face, the processor 240 will not allow access to the electronic device 200. If the decision 560 is that it is a human face, the processor 240 will determine that access to the electronic device 200 should be granted.

The method shown in FIG. 11 could be implemented in any suitable manner, such as entirely within an electronic device 200 or using a combination of devices. For instance, an electronic device 200 could collect data and provide the data to a server 104, which could then process the data and share it with the electronic device 200. Although FIG. 11 illustrates one example of a method 1100 to determine access to an electronic device 200 using a neural network to analyze the profile matching metric, the calculated phase differences and a result of applying FFT to a phase, various changes can be made to FIG. 11. For example, various steps in FIG. 11 could overlap, occur in parallel, occur serially, occur in a different order, or occur any number of times.

Figure 12:
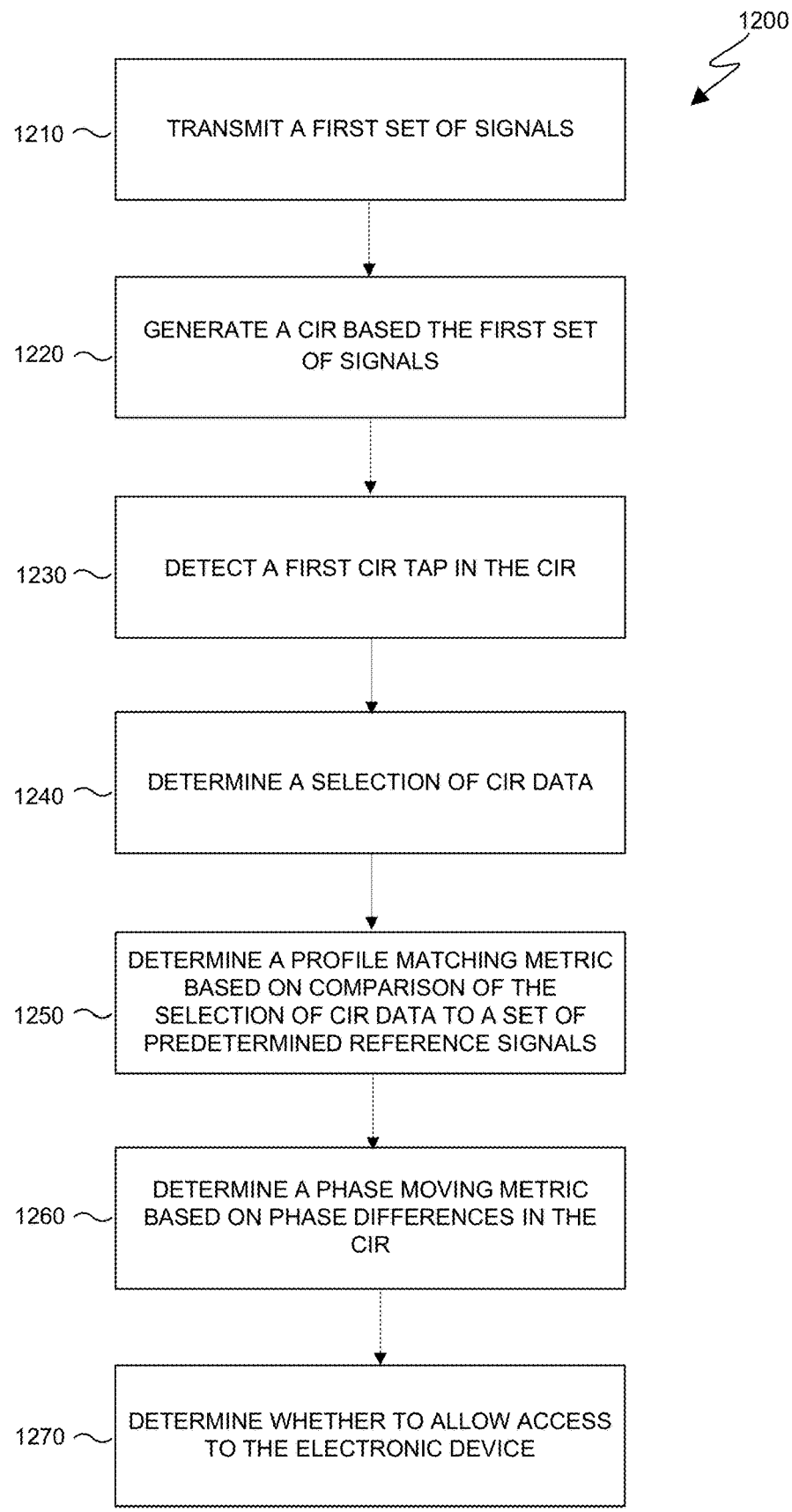
FIG. 12 illustrates a block diagram of an example method to determine whether to allow access to an electronic device according to embodiments of this disclosure.

FIG. 12 illustrates a block diagram of an example method 1200 to determine whether to allow access to the electronic device according to embodiments of this disclosure. The method 1200 may be performed by the server 104 and the electronic device 200 of FIG. 2, or any other suitable device or system. While the flow chart depicts a series of sequential steps, unless explicitly state, no inference should be drawn from that sequence regarding specific order of performance, performance of steps or portions thereof serially rather than concurrently or in an overlapping manner, or performance of the steps depicted exclusively without the occurrence of intervening of intermediate steps.

In block 1210, the electronic device transmits a first set of signals. For example, a radar transceiver such as the radar transceiver 270 of FIG. 2 or the transmitter 304 of the example monostatic radar of FIG. 3 transmits a first set of signals toward a human face or an object.

In block 1220, a CIR is generated based on receipt of reflections of the first set of signals. In block 1230, a first CIR tap is detected in the CIR. For example, the CIR is analyzed to determine a first tap having an amplitude above a predefined amplitude threshold or determines the first tap according to an index number. In block 1240, a selection of CIR data is determined based on the detected CIR taps or a predetermined index number.

In block 1250, a profile matching metric is calculated based on a comparison of the selection of CIR data to a set of predetermined reference signals. For example, the processor 200 or server 104, determines a set of predetermined reference signals based on radar reference signal data generated from registering a user. A first reference signal is selected from a candidate pool in the radar reference signal data. The reference signal matching metrics is determined between the first reference signal and other reference signals from the candidate pool. The processor then determines whether each of the reference signals matching metrics between the first reference signal and the other reference signals are greater than a reference signal matching threshold and the first reference signal is added to the set of predetermined reference signals when each of the reference signal matching metrics are greater than the reference signal matching threshold. According to embodiments of this disclosure, a user face is registered by the radar transceiver 270 transmitting signals toward a user face while the electronic device 240 moves a range of distance in relation to the user face while the user face moves to a plurality of different angles. For example, a user can hold the electronic device near the user's face and slowly move the electronic device 340 away from the user face while also moving the users face from side to side, up and down, etc. This process can be done multiple times from various starting points of the user's face to collect a large amount of data is collected for the registration of the user face. According to embodiments of this disclosure, the predetermined reference signal set can also be created from a large radar signal data collected from various users according to the method described in reference to FIG. 7.

In block 1260, a phase moving metric is determined based on phase differences in the CIR. For example, the processor 240 can determine the phase moving metric by concatenating the selected CIR data by frames and calculating phase differences among the frames by performing phase differentiation on the concatenated CIR data. The phase moving metric is the mean value of the phase differences. For another example, the processor can determine the phase moving metric by concatenating the selected CIR data by frames, determining a phase of the selected CIR data and applying Fast Fourier Transform (FFT) to the determined phase to produce frequency data. The phase moving metric can be calculated from the frequency data by calculating the variance of different antenna pairs for each frequency component and tap to find the minimal value across frequency component and taps. The minimal value is the phase moving metric. According to some embodiments, a sum of the amplitude of the frequency data can be calculated to determine the phase moving metric.

In block 1270, a determination whether to allow access to the electronic device is made. For example, the determination whether to allow access to the electronic device 200 is based on a comparison of a profile matching metric to a profile matching threshold. If the profile matching metric is higher than the predefined profile matching threshold then the processor 240 determines that the object is not a human face and does not allow access to the electronic device 200. As another example, the determination whether to allow access to the electronic device 200 is further based on a phase moving metric and a phase moving threshold. If the phase moving metric is smaller than the predetermined phase moving threshold then the processor 240 determines that the object is not a human face and does not allow access to the electronic device 200. For another example, the determination whether to allow access to the electronic device can be based on another phase moving metric and another phase moving threshold. If the other phase moving metric is greater than the other phase moving threshold, the processor 240 determines that the object is not a human face and does not allow access to the electronic device 200. According to embodiments of this disclosure the determination of whether to allow access to the electronic device 200 can be based on a neural network analysis of a profile matching metric, a calculated phase differences and a result of an application of FFT to a calculated phase. According to embodiments of this disclosure the determination of whether to allow access to the electronic device 200 can be further based on a deep learning analysis of CIR data.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An electronic device comprising:
    a radar transceiver; and
    at least one processor configured to:
        transmit, via the radar transceiver, a first set of signals for facial authentication to allow access to the electronic device;
        generate a channel impulse response (CIR) based on receipt of reflections of the first set of signals;
        detect a first CIR tap in the CIR based on an amplitude threshold;
        determine a selection of CIR data based on the detected first CIR tap;
        determine a profile matching metric based on comparison of the selection of CIR data to a set of predetermined reference signals; and
        determine whether to allow access to the electronic device based on comparison of the profile matching metric to a profile matching threshold.

2. The electronic device of claim 1, wherein the at least one processor is further configured to:
    determine the set of predetermined reference signals based on radar reference signal data generated from a registration of a user, wherein determining the set of predetermined reference signals comprises:
    select a first reference signal from a candidate pool in the radar reference signal data;
    determine reference signal matching metrics between the first reference signal and other reference signals from the candidate pool;
    determine whether each of the reference signals matching metrics between the first reference signal and the other reference signals are greater than a reference signal matching threshold; and
    add the first reference signal to the set of predetermined reference signals when each of the reference signal matching metrics are greater than the reference signal matching threshold.

3. The electronic device of claim 2, wherein to register the user, the at least one processor is configured to:
    transmit signals from the electronic device toward a user face, wherein while transmitting the signals the electronic device moves a range of distance in relation to the user face while the user face moves to a plurality of different angles.

4. The electronic device of claim 1, wherein the at least one processor is further configured to:
    concatenate the selected CIR data by frames;
    calculate phase differences among the frames by performing phase differentiation on the concatenated CIR data; and
    determine a phase moving metric based on the calculated phase differences,
    wherein the determination of whether to allow access to the electronic device comprises determining to not allow access to the electronic device based on the phase moving metric being smaller than a phase moving threshold.

5. The electronic device of claim 1, wherein the at least one processor is further configured to:
    concatenate the selected CIR data by frames;
    determine a phase of the selected CIR data;
    apply Fast Fourier Transform (FFT) to the phase; and
    determine a phase moving metric,
    wherein the determination of whether to allow access to the electronic device comprises determining to not allow access to the electronic device based on the phase moving metric being larger than a phase moving threshold.

6. The electronic device of claim 4, wherein the at least one processor is further configured to:
    determine a phase of the selected CIR data; and
    apply FFT to the phase,
    wherein the determination of whether to allow access to the electronic device comprises a neural network analysis of the profile matching metric, the calculated phase differences and a result of applying FFT to the phase.

7. The electronic device of claim 1, wherein the determination of whether to allow access to the electronic device is further based on a deep learning analysis of the CIR data.

8. A method to determine access to an electronic device comprising:
    transmitting, via a radar transceiver of the electronic device, a first set of signals for facial authentication;
    generating a channel impulse response (CIR) based on receipt of reflections of the first set of signals;
    detecting a first CIR tap in the CIR based on an amplitude threshold;
    determining a selection of CIR data based on the detected first CIR tap;
    determining a profile matching metric based on comparison of the selection of CIR data to a set of predetermined reference signals; and
    determining whether to allow access to the electronic device based on comparison of the profile matching metric to a profile matching threshold.

9. The method of claim 8, further comprising:
    determining the set of predetermined reference signals based on radar reference signal data generated from registering a user, wherein determining the set of predetermined reference signals comprises:

selecting a first reference signal from a candidate pool in the radar reference signal data;
determining reference signal matching metrics between the first reference signal and other reference signals from the candidate pool;
determining whether each of the reference signals matching metrics between the first reference signal and the other reference signals are greater than a reference signal matching threshold; and
adding the first reference signal to the set of predetermined reference signals when each of the reference signal matching metrics are greater than the reference signal matching threshold.

10. The method of claim 9, wherein registering the user comprises:
transmitting signals from the electronic device toward a user face, wherein while transmitting the signals the electronic device moves a range of distance in relation to the user face while the user face moves to a plurality of different angles.

11. The method of claim 8, further comprising:
concatenating the selected CIR data by frames;
calculating phase differences among the frames by performing phase differentiation on the concatenated CIR data; and
determining a phase moving metric based on the calculated phase differences,
wherein determining whether to allow access to the electronic device comprises determining to not allow access to the electronic device based on the phase moving metric being smaller than a phase moving threshold.

12. The method of claim 8, further comprising:
concatenating the selected CIR data by frames;
determining a phase of the selected CIR data;
applying Fast Fourier Transform (FFT) to the phase; and
determining a phase moving metric,
wherein determining whether to allow access to the electronic device comprises determining to not to allow access to the electronic device based on the phase moving metric being larger than a phase moving threshold.

13. The method of claim 11, further comprising:
determining a phase of the selected CIR data; and
applying FFT to the phase,
wherein determining whether to allow access to the electronic device comprises a neural network analysis of the profile matching metric, the calculated phase differences and a result of applying FFT to the phase.

14. The method of claim 8, further comprising:
determining whether to allow access to the electronic device is further based on a deep learning analysis of the CIR data.

15. A non-transitory computer readable medium configured to store a plurality of instructions that, when executed by at least one processor of an electronic device is configured to cause the at least one processor to:
transmit, via a radar transceiver of the electronic device, a first set of signals for facial authentication to allow access to the electronic device;
generate a channel impulse response (CIR) based on receipt of reflections of the first set of signals;
detect a first CIR tap in the CIR based on an amplitude threshold;
determine a selection of CIR data based on the detected first CIR tap;
determine a profile matching metric based on comparison of the selection of CIR data to a set of predetermined reference signals; and
determine whether to allow access to the electronic device based on comparison of the profile matching metric to a profile matching threshold.

16. The non-transitory computer readable medium of claim 15, wherein the plurality of instructions is further configured to cause the processor to:
determine the set of predetermined reference signals based on radar reference signal data generated from a registration of a user, wherein determining the set of predetermined reference signals comprises:
select a first reference signal from a candidate pool in the radar reference signal data;
determine reference signal matching metrics between the first reference signal and other reference signals from the candidate pool;
determine whether each of the reference signals matching metrics between the first reference signal and the other reference signals are greater than a reference signal matching threshold; and
add the first reference signal to the set of predetermined reference signals when each of the reference signal matching metrics are greater than the reference signal matching threshold.

17. The non-transitory computer readable medium of claim 16, wherein the plurality of instructions further comprises instructions for the registration of the user that when executed cause the at least processor to:
transmit signals from the electronic device toward a user face, wherein while transmitting the signals the electronic device moves a range of distance in relation to the user face while the user face moves to a plurality of different angles.

18. The non-transitory computer readable medium of claim 15, wherein the plurality of instructions is further configured to cause the processor to:
concatenate the selected CIR data by frames;
calculate phase differences among the frames by performing phase differentiation on the concatenated CIR data; and
determine a phase moving metric based on the calculated phase differences,
wherein the plurality of instructions that when executed cause the at least one processor to determine whether to allow access to the electronic device comprise instructions that when executed cause the at least one processor to:
determine to not allow access to the electronic device based on the phase moving metric being smaller than a phase moving threshold.

19. The non-transitory computer readable medium of claim 15, wherein the plurality of instructions is further configured to cause the processor to:
concatenate the selected CIR data by frames;
determine a phase of the selected CIR data;
apply Fast Fourier Transform (FFT) to the phase; and
determine a phase moving metric,
wherein the plurality of instructions that when executed cause the at least one processor to determine whether to allow access to the electronic device comprise instructions that when executed cause the at least one processor to:
determine to not to allow access to the electronic device based on the phase moving metric being larger than a phase moving threshold.

20. The non-transitory computer readable medium of claim 18, wherein the plurality of instructions is further configured to cause the processor to:
  determine a phase of the selected CIR data; and
  apply FFT to the phase,
  wherein the plurality of instructions that when executed cause the at least one processor to determine whether to allow access to the electronic device comprise instructions that when executed cause the at least one processor to:
    apply a neural network analysis to the profile matching metric, the calculated phase differences and a result of the application of FFT to the phase.

\* \* \* \* \*